United States Patent
Van Putten et al.

(10) Patent No.: US 10,393,943 B2
(45) Date of Patent: Aug. 27, 2019

(54) DISPLAY DEVICE WITH DIRECTIONAL CONTROL OF THE OUTPUT, AND A BACK LIGHT FOR SUCH A DISPLAY DEVICE

(71) Applicant: KONINKLIJKE PHILIPS N.V., Eindhoven (NL)

(72) Inventors: Eibert Gerjan Van Putten, Eindhoven (NL); Bart Kroon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 186 days.

(21) Appl. No.: 15/506,464

(22) PCT Filed: Sep. 18, 2015

(86) PCT No.: PCT/EP2015/071392
§ 371 (c)(1),
(2) Date: Feb. 24, 2017

(87) PCT Pub. No.: WO2016/046068
PCT Pub. Date: Mar. 31, 2016

(65) Prior Publication Data
US 2018/0224591 A1  Aug. 9, 2018

(30) Foreign Application Priority Data
Sep. 25, 2014  (EP) .................................. 14186327

(51) Int. Cl.
*F21V 8/00* (2006.01)
*H04N 13/305* (2018.01)
*G02B 27/22* (2018.01)

(52) U.S. Cl.
CPC ....... *G02B 6/0038* (2013.01); *G02B 27/2214* (2013.01); *H04N 13/305* (2018.05); *G02B 6/005* (2013.01); *H04N 2213/001* (2013.01)

(58) Field of Classification Search
CPC .. G02B 6/0038; G02B 27/2214; G02B 6/005; H04N 13/305; H04N 2213/001
USPC ....................................................... 362/611
See application file for complete search history.

(56) References Cited

U.S. PATENT DOCUMENTS

| | | | |
|---|---|---|---|
| 7,507,012 | B2 | 3/2009 | Aylward et al. |
| 7,561,217 | B2 | 7/2009 | Hu et al. |
| 7,876,397 | B2 | 1/2011 | Kirjn et al. |
| 8,085,360 | B2 | 12/2011 | Kurihara |
| 2007/0069978 | A1 | 3/2007 | Daiku |
| 2007/0109811 | A1 | 5/2007 | Krijn |

(Continued)

FOREIGN PATENT DOCUMENTS

| | | |
|---|---|---|
| JP | 2010277901 A | 12/2010 |
| JP | 2014164133 A | 9/2014 |
| WO | 2011145031 A2 | 11/2011 |

*Primary Examiner* — Anh T Mai
*Assistant Examiner* — Jessica M Apenteng

(57) ABSTRACT

A display backlight comprises an edge-lit waveguide having an array of light out-coupling structures which for example each comprise a projection into the waveguide. Each projection has a beam redirecting face which is at an angle a to the normal. The angle a and the refractive index of the waveguide as well as outside the waveguide (over the output face) are designed to satisfy various relationships, which ensure that the optical output can be selected to be within a desired angular range in a generally forward direction (and thus not clipped).

15 Claims, 8 Drawing Sheets

(56) References Cited

U.S. PATENT DOCUMENTS

| | | |
|---|---|---|
| 2009/0040426 A1 | 2/2009 | Mather |
| 2010/0053500 A1* | 3/2010 | Sugita .................. G02B 3/0006 349/62 |
| 2010/0079584 A1 | 4/2010 | Sung et al. |
| 2011/0157339 A1 | 6/2011 | Bennett et al. |
| 2012/0105767 A1 | 5/2012 | Choi |
| 2012/0147059 A1 | 6/2012 | Chen et al. |
| 2012/0294029 A1 | 11/2012 | Wu |
| 2013/0027909 A1 | 1/2013 | Kim et al. |

* cited by examiner

ND A BACK
DISPLAY DEVICE WITH DIRECTIONAL CONTROL OF THE OUTPUT, AND A BACK LIGHT FOR SUCH A DISPLAY DEVICE

CROSS-REFERENCE TO PRIOR APPLICATIONS

This application is the U.S. National Phase application under 35 U.S.C. § 371 of International Application No. PCT/EP2015/071392, filed on Sep. 18, 2015, which claims the benefit of EP Patent Application No. EP 14183127.4, filed on Sep. 25, 2014. These applications are hereby incorporated by reference herein.

FIELD OF THE INVENTION

This invention relates to a backlight for a display device, which is particularly suitable for a display device in which images are displayed in a narrow range of output directions. One example is an autostereoscopic display device which comprises a display panel having an array of display pixels, and an arrangement for directing different views to different physical locations. Another example is a privacy display in which a display image is provided only in the direction of a viewer.

BACKGROUND OF THE INVENTION

A known autostereoscopic display device comprises a two-dimensional liquid crystal display panel having a row and column array of display pixels (wherein a "pixel" typically comprises a set of "sub-pixels", and a "sub-pixel" is the smallest individually addressable, single-colour, picture element) acting as an image forming means to produce a display. An array of elongated lenses extending parallel to one another overlies the display pixel array and acts as a view forming means. These are known as "lenticular lenses". Outputs from the display pixels are projected through these lenticular lenses, which function to modify the directions of the outputs.

The lenticular lenses are provided as a sheet of lens elements, each of which comprises an elongate semi-cylindrical lens element. The lenticular lenses extend in the column direction of the display panel, with each lenticular lens overlying a respective group of two or more adjacent columns of display sub-pixels.

Each lenticular lens can be associated with two columns of display sub-pixels to enable a user to observe a single stereoscopic image. Instead, each lenticular lens can be associated with a group of three or more adjacent display sub-pixels in the row direction. Corresponding columns of display sub-pixels in each group are arranged appropriately to provide a vertical slice from a respective two dimensional sub-image. As a user's head is moved from left to right a series of successive, different, stereoscopic views are observed creating, for example, a look-around impression.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of rows and columns of display sub-pixels 5. For the sake of clarity, only a small number of display sub-pixels 5 are shown in the Figure. In practice, the display panel 3 might comprise about one thousand rows and several thousand columns of display sub-pixels 5. In a black and white display panel a sub-pixel in fact constitutes a full pixel. In a colour display a sub-pixel is one colour component of a full colour pixel. The full colour pixel, according to general terminology comprises all sub-pixels necessary for creating all colours of a smallest image part displayed. Thus, e.g. a full colour pixel may have red (R) green (G) and blue (B) sub-pixels possibly augmented with a white sub-pixel or with one or more other elementary coloured sub-pixels. The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material there between. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display sub-pixels 5 being driven to modulate the light and produce the display. The backlight 7 has side edges 7a and 7b, a top edge 7c and a bottom edge 7d. It has a front face from which light is output.

The display device 1 also comprises a lenticular sheet 9, arranged over the display side of the display panel 3, which performs a light directing function and thus a view forming function. The lenticular sheet 9 comprises a row of lenticular elements 11 extending parallel to one another, of which only one is shown with exaggerated dimensions for the sake of clarity.

The lenticular elements 11 are in the form of convex (semi-) cylindrical lenses each having an elongate axis 12 extending perpendicular to the cylindrical curvature of the element, and each element acts as a light output directing means to provide different images, or views, from the display panel 3 to the eyes of a user positioned in front of the display device 1.

The display device has a controller 13 which controls the backlight and the display panel.

The autostereoscopic display device 1 shown in FIG. 1 is capable of providing several different perspective views in different directions, i.e. it is able to direct the pixel output to different spatial positions within the field of view of the display device. In particular, each lenticular element 11 overlies a small group of display sub-pixels 5 in each row, where, in the current example, a row extends perpendicular to the elongate axis of the lenticular element 11. The lenticular element 11 projects the output of each display sub-pixel 5 of a group in a different direction, so as to form the several different views. As the user's head moves from left to right, his/her eyes will receive different ones of the several views, in turn.

FIG. 2 shows the principle of operation of a lenticular type imaging arrangement as described above in more detail and shows the backlight 20, the display device 24, the liquid crystal display panel and the lenticular array 28 in cross section. FIG. 2 shows how the lenticular 27 of the lenticular arrangement 28 directs the outputs of the pixels 26', 26" and 26''' of a group of pixels to the respective three different spatial locations 22', 22" and 22''' in front of the display device. The different locations 22', 22" and 22''' are part of three different views.

In a similar manner, the same output of display pixels 26', 26" and 26' is directed into the respective three other different spatial locations 25', 25" and 25''' by the lenticular 27' of the arrangement 28. While the three spatial positions 22' to 22''' define a first viewing zone or cone 29', the three spatial positions 25' to 25' define a second viewing cone 29". It will be appreciated that more of such cones exist (not shown) depending on the number of lenticular lenses of the array that can direct the output of a group of pixels such as formed by the pixels 26' to 26'. The cones fill the entire field of view of the display device.

The above view directing principle leads to view repetition occurring upon going from one viewing cone to another as within every cone the same pixel output is displayed in a particular view. Thus, in the example of FIG. 2, spatial positions 22" and 25" provide the same view, but in different viewing cones 29' and 29" respectively. In other words, a particular view shows the same content in all viewing cones. At the boundaries between viewing cones, there is a jump between extreme views, so that the autostereoscopic effect is disrupted.

A solution to this problem is to allow only a single viewing cone, for example by designing the backlight to have a directional output. WO 2011/145031 discloses various approaches for defining a display with a single cone output.

The use of a collimated backlight for controlling the direction from which a view can be seen is for example known for several different applications, including for gaze tracking applications, privacy panels and enhanced brightness panels. One known component of such a collimated backlight is a light generating component which extracts all of its light in the form of an array of thin light emitting stripes spaced at around the pitch of a lenticular lens that is also part of the backlight.

This configuration is shown in FIG. 3 in which the backlight 7 comprises an array 30 of striped light emitters, a positive lens array 32 and a replica structure 34 between the lens array and the emitters. The lens array 32 collimates the light coming from the array 30 of thin light emitting stripes. Such a backlight can be formed from a series of emissive elements, such as lines of LEDs or OLED stripes.

However, such solutions are expensive to fabricate and prone to failure due to a short lifetime in the case of OLEDs.

The broad angular emission pattern of the light emitting elements also illuminates multiple lenses simultaneously, and thereby they still create cone repetition.

Edge lit waveguides for backlighting and front-lighting of displays are inexpensive and robust. It would therefore be advantageous to base a collimated backlight component around the edge lit technology. However the known edge lit waveguides are designed to provide maximum uniformity of light output across the entire surface of the waveguide and are therefore not designed for generating an array of thin light stripes spaced at around the pitch of a combined lens.

FIG. 4 shows a schematic image of an edge lit waveguide 40. The waveguide comprises a waveguide material, such as a slab of solid material with a top face 40a, a bottom face 40b and lateral edges 40c. There are top and bottom edges which cannot be seen in FIG. 4, as the cross section of FIG. 4 is taken in the lateral side-to-side direction. The waveguide is generally rectangular in plan view. The top and bottom edges of the waveguide (at the top and bottom sides of the rectangle) correspond to the top and bottom of the associated display, and the lateral edges (at the left and right sides of the rectangle) correspond to the left and right sides of the associated display. From the left side in FIG. 4, light is coupled in from a light source 42 and at the bottom of the waveguide several out-coupling structures 44 are placed. Light propagates under an angle $\theta_{in}$ inside the waveguide with height H. The out-coupling structures 44 in this example are drawn as half prisms with a half top angle α, height h, and a width w.

The waveguide is formed as a dielectric slab made out of e.g. glass or polycarbonate. In the slab, total internal reflection at the borders keeps the light confined while the light propagates. The edges of the slab are typically used to couple in light and the small structures 44 locally couple light out of the waveguide.

If it is assumed that light is coupled in on one edge of the waveguide, the out-coupling efficiency of the structures should vary across the waveguide to ensure a homogeneous out-coupling. The out-coupling efficiency of a structure can be tuned in different ways. For example, if the structure resembles a prism-like shape (or half of a prism), the out-coupling efficiency can be modified by changing either the height h of the prism, by changing the half top angle α or by changing both.

The invention is based on the optimization of a waveguide type backlight for use in an autostereoscopic display or privacy display, in particular to enable generation of a striped output.

SUMMARY OF THE INVENTION

The invention is defined by the claims.

According to an example, there is provided a display backlight, comprising:

a waveguide material having a refractive index $n_{wg}$, and having top and bottom parallel faces, and a pair of opposite side edges, wherein the light output is from the top face;

a light source arrangement for providing light into the waveguide material at one or both of the opposite side edges; and an array of light out-coupling structures formed at the top or bottom parallel face, for redirecting light so that it escapes from the waveguide at the location of the light out-coupling structures, wherein the light out-coupling structures provide escaped light with a range of output directions which is limited to less than 180 degrees and which is angularly spaced from the plane of the top face.

The light out-coupling structures in this way produce an output beam which is less than 180 degrees wide, and can be much narrower, so that at least partial collimation function is implemented. Furthermore, the output beam is not clipped by the top face, so that the output beam is directed generally forwards and does not include components parallel to the top face. This means the lateral direction of the output beam can be chosen by suitable design, while maintaining the same angular spread. These conditions thus enable the design of the backlight to be tailored to provide a desired angle of the output beam from the backlight and in a desired direction. In this way, when used in combination with a display, the direction in which a displayed image is output to the user can be controlled. This has applications for privacy displays and autostereoscopic displays, in particular.

The light-out coupling furthermore each comprise a projection into the waveguide material, each projection having a beam redirecting face which is at an angle to a direction normal to the top and bottom faces. The waveguide material has indentations for providing light out-coupling, and these may be at the top or bottom of the waveguide.

The backlight is adapted to be used with a refractive index outside the waveguide material, over the top face, of $n_{out}$, and wherein for a refractive index ratio $m=n_{wg}/n_{out}$:

$$1 < m < \sqrt{2}; \text{ and}$$

$$\left(90° - \sin^{-1}\left(\frac{1}{m}\right)\right) < \alpha < \sin^{-1}\left(\frac{1}{m}\right)$$

wherein $\alpha$ is the angle of the beam directing face to the normal direction.

These relationships between the refractive index values and the slant angle of the redirecting faces give rise to the desired optical output directions from the backlight which are limited (i.e. less than 180 degrees) and not clipped (i.e. a sub-range of output angles is defined generally centrally within the overall 180 degree output). The refractive index ratio m is typically lower than for conventional waveguide materials.

In one example, all of the light out-coupling structures have the same beam redirecting face angle $\alpha$. This means all of the light outputs from the different light out-coupling structures are defined as parallel beamlets.

In another example, the light out-coupling structures comprise a plurality of sets, the light out-coupling structures within each set having the same beam redirecting face angle $\alpha$, and the different sets having different beam redirecting face angles $\alpha$. This means the light outputs from the different light out-coupling structures define sets of parallel beamlets. This can be used to provide different images in different directions, by using different beamlets to illuminate different pixels of a display panel.

The light out-coupling structures may each comprise a column spanning from the top edge to the bottom edge, and wherein the display backlight further comprises an array of lenticular lenses over the waveguide material, each lens overlying an associated light out-coupling column or an associated plurality of light out-coupling columns.

The columns are used to form a striped backlight output. The striped output then illuminates a lens, and this is used to create a collimated output to provide an output in a desired direction, for example for a privacy display.

The range of output directions $\beta$ may be selected to be:

$$\beta = 2\tan^{-1}(p/2e)$$

where p is pitch of the lenticular lenses and e is the optical path length from the light out-coupling structures to the lens array.

This defines an arrangement which can prevent cone repetition. In particular, the angular width is matched to the lenticular lenses such that each out-coupled beam only hits one lens.

For the example in which all of the light out-coupling structures have the same beam redirecting face angle $\alpha$, each lenticular lens may for example be centered over a single associated light out-coupling column, the angle $\alpha$ is 45 degrees, and the light redirected from each light out-coupling column has an angular width such that only one lenticular lens is substantially illuminated by reflected light from the light out-coupling column.

By ensuring that the light from a light out-coupling column only reaches one lens, a single viewing cone can be defined.

For the example in which the light out-coupling structures comprise a plurality of sets, each lens may for example overlie one light out-coupling column from each set, wherein the light from each light out-coupling column has an angular width such that only a portion of one lenticular lens is illuminated by redirected light from the light out-coupling column.

In this way, one lens can generate an output beamlet in different output directions for different light out-coupling columns beneath the lens. This can be used to present different images in different directions, for example for use in an autostereoscopic display.

In one set of examples, the beam redirecting face of each light out-coupling structure may comprise a reflecting face, and the light out-coupling structures are provided on the bottom face. The bottom face then uses reflection to generate output light columns. This reflection may be based on total internal reflection or the projections may have a reflective coating.

The light source arrangement may be for providing light to both side edges, and each light out-coupling structure then comprises a pair of reflecting faces at an angle $\alpha$ on opposite sides of the normal to the top and bottom faces. This enables illumination from both opposite edges.

In this example, the refractive indices may satisfy $1.05 < m < 1.22$.

In another set of examples, the light out-coupling structures may be provided on the top face, and wherein the top face of the waveguide material is provided with a coating which fills the projections, wherein the coating has a refractive index higher than the refractive index $n_{wg}$ of the waveguide material. This enables total internal reflection from the projections in the top face.

The light out-coupling structures may each again comprise a column spanning from the top edge to the bottom edge.

In this example the refractive indices may satisfy $m < 1.05$, for example $m < 1.01$.

An autostereoscopic display device or a privacy display may combine the backlight with a display panel having an array of display pixels for producing a display image, the display illuminated by the backlight.

Another aspect provides an autostereoscopic display device comprising:

a backlight as defined above which makes use of a plurality of sets of light out-coupling structures; and a display panel having an array of display pixels for producing a display image, the display illuminated by the backlight, wherein the display device further comprises a further array of lenticular lenses provided over the display, with a one-to-one mapping between lenses of the display backlight and the lenses of the further array.

The multiple sets of light out-coupling structures enable multiple views to be generated, and the further lens array enables further views to be generated.

The lenses of the display backlight are for example positive lenses whereas the lenses of the further array are negative lenses. The display panel may comprise an LCD panel, although other transmissive display panels may be used.

BRIEF DESCRIPTION OF THE FIGURES

Embodiments of the invention will now be described, purely by way of example, with reference to the accompanying drawings, in which.

DETAILED DESCRIPTION OF THE EMBODIMENTS

The invention provides a display backlight comprising an edge-lit waveguide having an array of light out-coupling structures which each comprise a projection into the waveguide. Each projection has a beam redirecting face which is at an angle α to the normal. The angle α and the refractive index of the waveguide as well as outside the waveguide (over the output face) are designed to satisfy various relationships, which ensure that the optical output can be selected to be within a desired angular range in a generally forward direction (and thus not clipped).

The invention is based on an analysis of the characteristics of the optical output from a waveguide backlight.

The angle under which light couples out of the waveguide is mostly determined by parameters of the out-coupling structure. In the example of a prism-like structure, the light is redirected to another angle based on the half top angle α of the structure. This half angle corresponds to the angle of the side surface of the prism shape with respect to the normal direction. Furthermore, the width of the out-coupled beam depends mostly on the ratio m of the refractive index of the waveguide $n_{wg}$ and the refractive index $n_{out}$ outside the waveguide.

Figure 1:
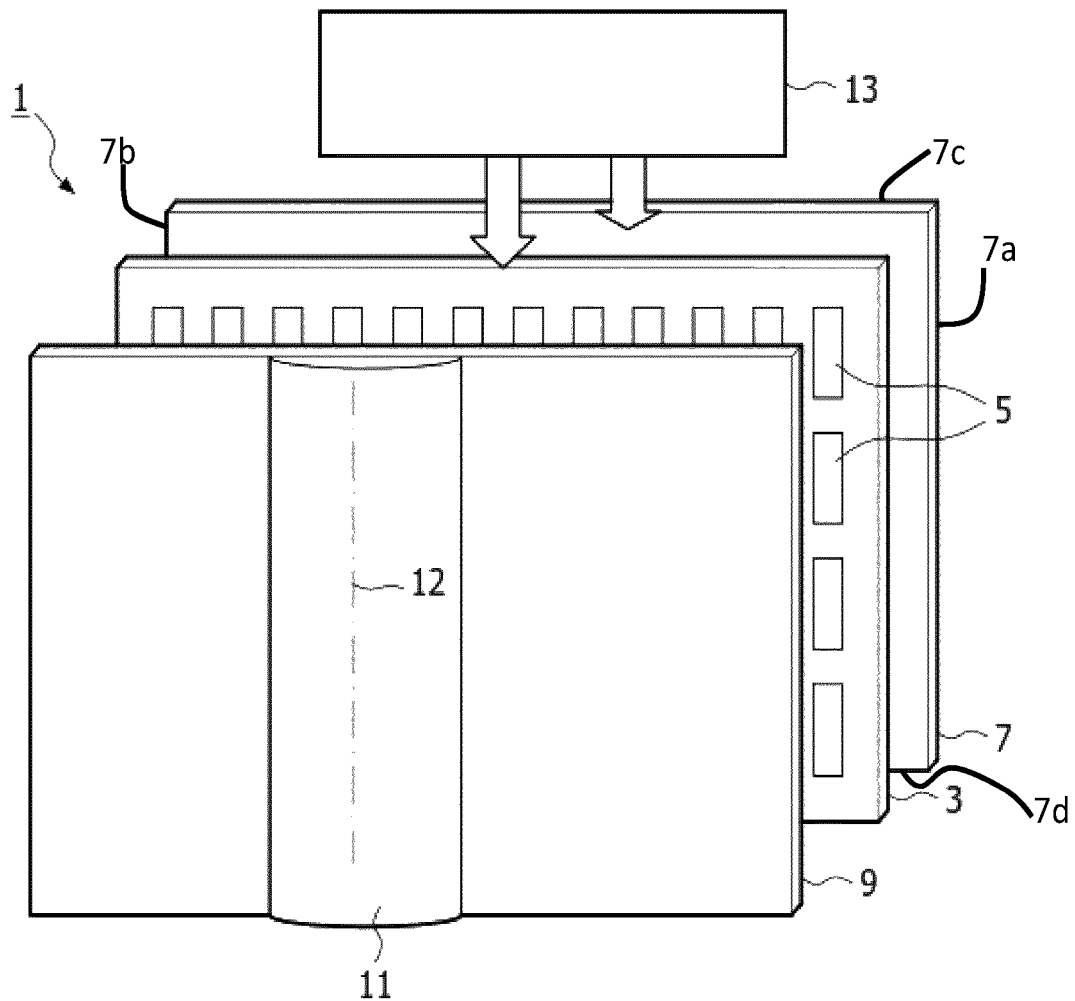
FIG. 1 is a schematic perspective view of a known autostereoscopic display device.
Figure 2:
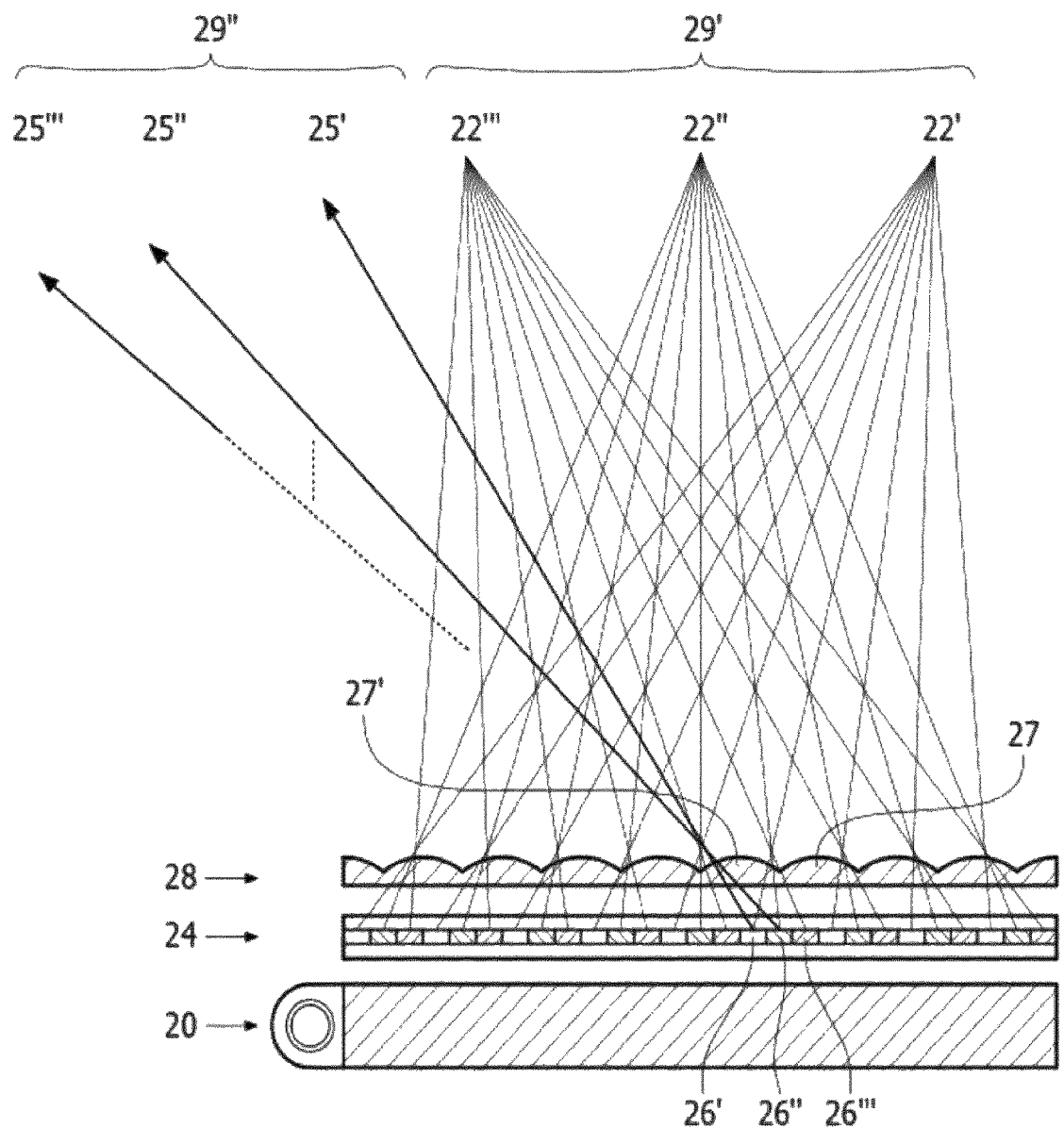
FIG. 2 is a schematic cross sectional view of the display device shown in FIG. 1.
Figure 3:
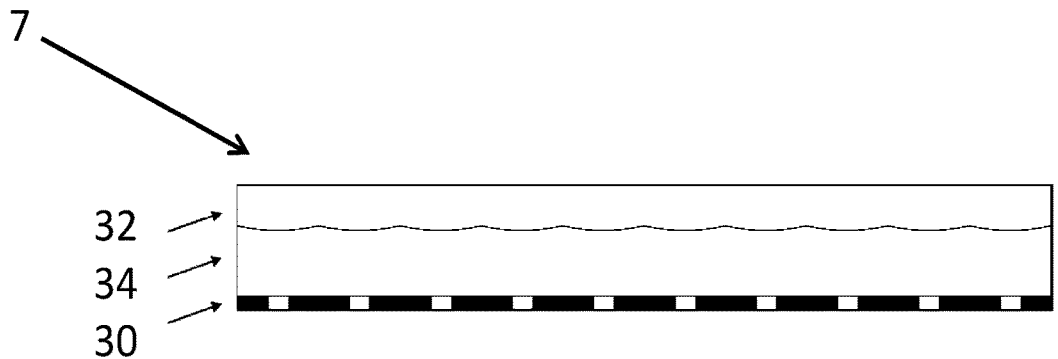
FIG. 3 shows a known directional backlight design using striped emitters.
Figure 4:
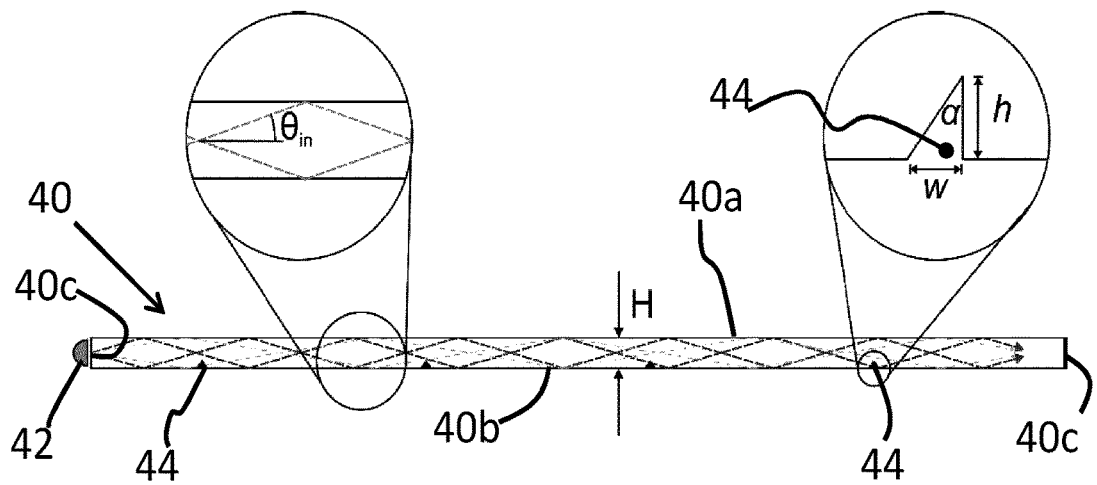
FIG. 4 shows a known backlight design using an edge-lit waveguide.
Figure 5:
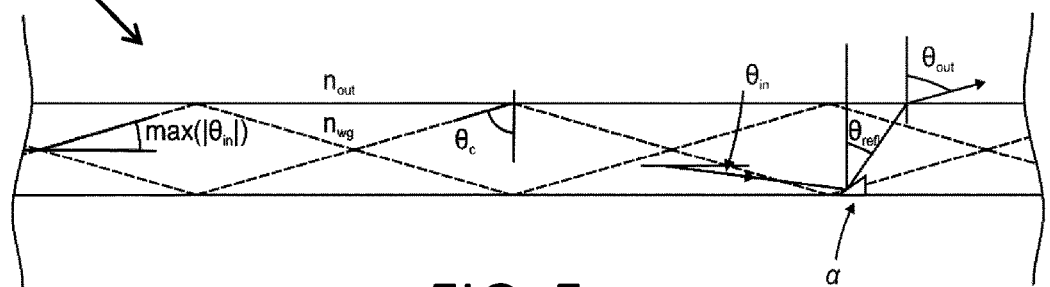
FIG. 5 is used to provide an analysis of the optical function of the waveguide of FIG. 4.

FIG. 5 shows part of a waveguide 40 to elucidate the calculations of the direction of the outgoing beam. The refractive index ratio between the waveguide and the outside of the waveguide, $m=n_{wg}/n_{out}$, defines the critical angle:

$$\theta_c = \sin^{-1}(1/m)$$

The refractive index ratio m should be larger than 1 to be able to guide any light inside the waveguide. Light hitting the surface with an angle larger than the critical angle will be totally internally reflected. This means that there is a range of angles that can propagate through the waveguide:

$$\theta_{in} = [-90°+\theta_c, 90°-\theta_c]$$

Any out-coupling structure in the waveguide can couple the light out of the waveguide. In this example, each light out-coupling structure comprises a beam redirecting face in the form of a reflecting face, and the light out-coupling structures are provided on the bottom face of the waveguide 40. The reflection from the light out-coupling structure changes the angle under which the light propagates in the waveguide from $\theta_{in}$ to $\theta_{refl}$ in the following way:

$$\theta_{refl} = 2\alpha - \theta_{in} - 90°$$

If the light after reflection has an angle where $|\theta_{refl}| < \theta_c$, it couples out of the waveguide. When the light couples out it is also refracted at the interface. The resulting outgoing direction $\theta_{out}$ is therefore $$\theta_{out} = \sin^{-1}[m \sin(\theta_{refl})] = \sin^{-1}[m \sin(2\alpha - \theta_{in} - 90°)] \quad (1)$$

There are different out-coupling structures possible to modify the direction of the light in order to direct it out of the waveguide. The structures do not have to be located at the bottom of the waveguide but structures at the top of the waveguide are also possible. The prism structures discussed in this document should therefore not be considered limiting, but merely be taken as an example. The invention is also valid for other out-coupling structures but the change in direction that these structures accomplish might be described by a different parameter than the half top angle α used in this example. The figures, equations, and conditions should then be changed accordingly to reflect this difference.

The angular width β of the out-coupled beam can be found by calculating the minimum and maximum outgoing angle for the range of angles inside the waveguide, using equation (1). The angular width is plotted as function of the half top angle α and the refractive index ratio m in FIG. 6.

Figure 6:
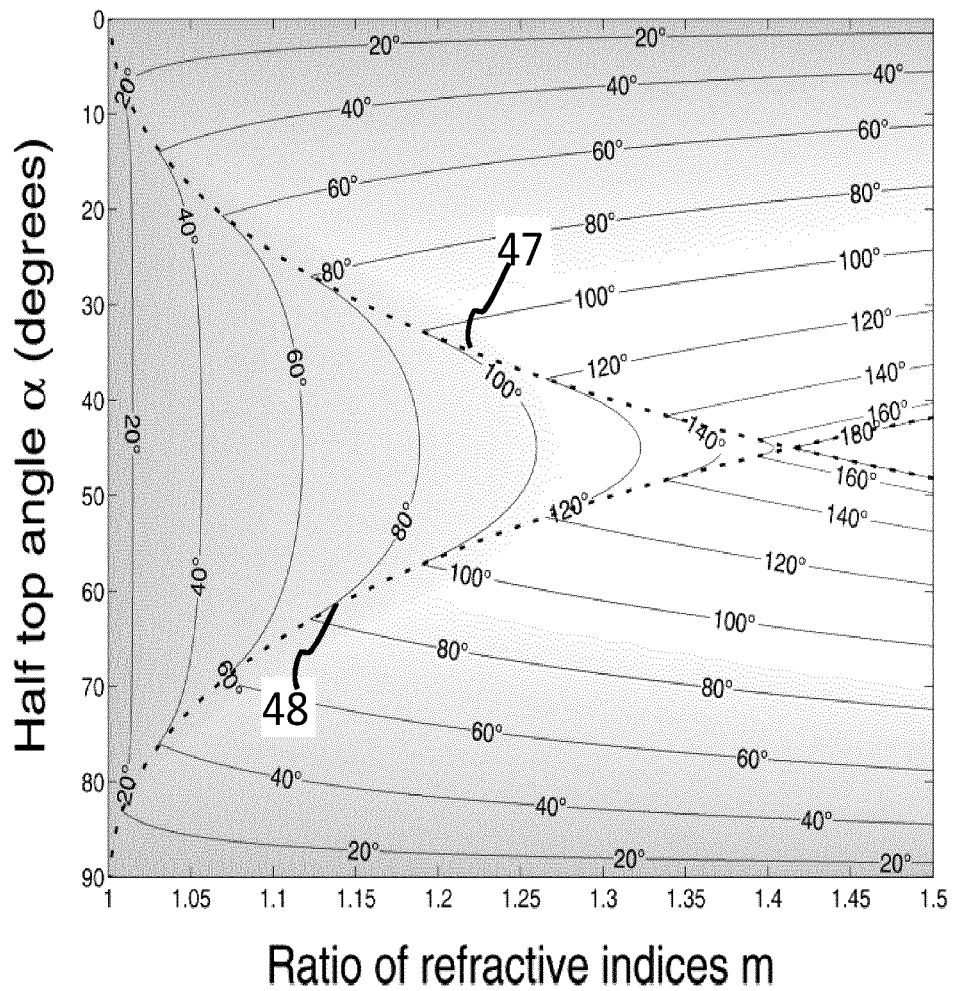
FIG. 6 shows an analysis of the angular width of the output from the waveguide of FIGS. 4 and 5.

FIG. 6 shows that there are different areas, where the borders are indicated by the dotted lines 47,48. In this way three separate regimes can be identified based on the parameters a and m:

(i) A regime where the angular range of the outgoing beam is always [−90,90] irrespective of the values a and m.

(ii) A regime where one edge of the angular range is either −90 degrees or 90 degree (clipped).

(iii) A regime where both edges of the angular range are within [−90,90] such that the outgoing beam can be steered within this range.

Only in the last regime a fully steerable outgoing beam can be created that is not clipped.

Figure 7:
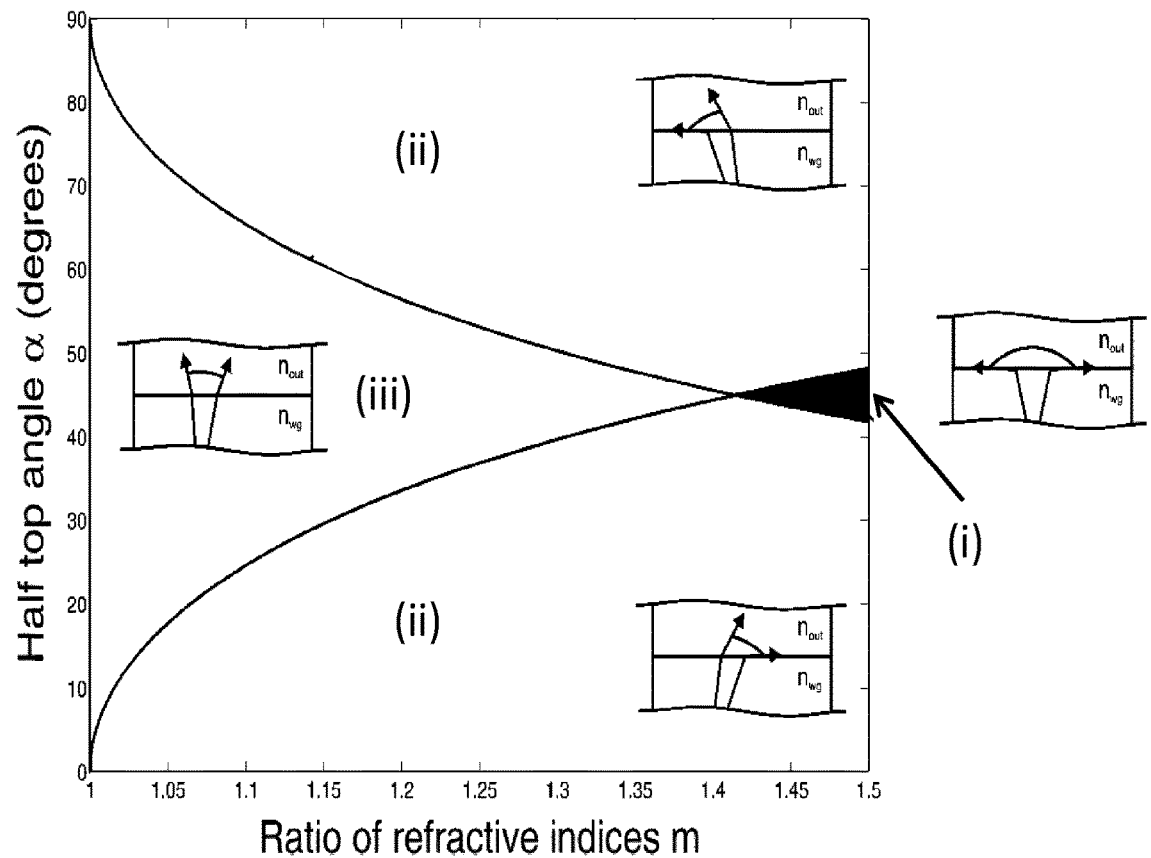
FIG. 7 shows how the function illustrated in FIG. 6 defines three separate regions.

In FIG. 7, the three different regimes are indicated as (i), (ii) and (iii).

For a typical waveguide made by e.g. polymethyl methacrylate (PMMA) surrounded by air, ($n_{wg}$=1.49 hence m=1.49), it is not possible to create an unclipped steerable beam. The invention thus makes use of other combinations of materials that result in a smaller refractive index ratio than in conventional waveguides, in order to enable the control of the beam width and direction and to prevent clipping of the beam provided by the light out-coupling structures.

The desired lower refractive index ratio for the waveguide may for example be achieved using the combination of PMMA with certain glues to form two different materials with small refractive index difference. Doped glasses, for example a glass doped with Germania ($GeO_2$) are widely used in optical fiber technology. Again, an undoped glass and a doped glass together can define a desired low refractive index difference.

Only in the regime (iii), the out-coupled beam can be steered by changing the half top angle α of the out-coupling structure. In the regime (i) the out-coupled beam is always 180 degrees wide and changing the half top angle α will not change the direction of the beam. In the regime (ii) the out-coupled beam is always clipped on one side.

For certain implementations it is advantageous to be able to direct the outgoing beams of light into different directions across the waveguide without clipping. Such directionality would then require that the outgoing beam is significantly smaller than 180 degrees.

One very relevant example where an unclipped beam is desired is when a waveguide and a lens array are used to create a collimated backlight. If the angular range of the outgoing beam is too broad, it will cause unwanted cone repetitions that create more than one collimated beam.

Based on the analysis above, the invention provides a backlight design which is limited to the regime (iii). The waveguide has a refractive index $n_{wg}$ and has out-coupling structures with half top angles $\alpha$ in a surrounding material with a refractive index $n_{out}$ such that the following two conditions hold:

$$1 < m < \sqrt{2}, m \equiv n_{wg}/n_{out}$$

$$\left(90° - \sin^{-1}\left(\frac{1}{m}\right)\right) < \alpha < \sin^{-1}\left(\frac{1}{m}\right)$$

These conditions mean that the out-coupled beam can be freely steered by changing the angle $\alpha$ without being clipped.

Within the general regime defined by these relationships, the conditions can be restricted further to match the specific needs of different embodiments.

A first embodiment provides a design which avoids cone repetition in a striped backlight.

Figure 8:
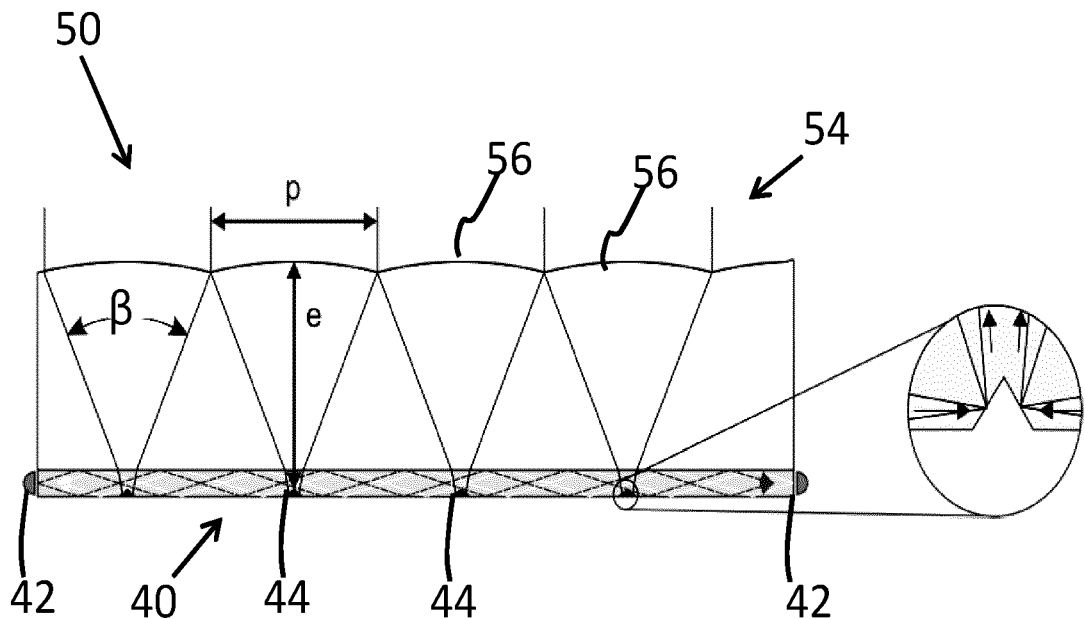
FIG. 8 shows a first example of a directional backlight.

The backlight 50 is shown in FIG. 8. It comprises a waveguide 40 as explained above. The example shows the waveguide 40 illuminated from both lateral side edges by a light source arrangement having two light sources 42. The light sources may comprise LEDs or CCFL (cold cathode fluorescent lamps) for example.

The light out-coupling structures 44 each comprise a column spanning from the top edge to the bottom edge of the waveguide 40 (so that FIG. 8 is a cross section in the row direction). The backlight has an array 54 of lenticular lenses 56 over the waveguide 40. Each lens 56 overlies an associated light out-coupling column 44.

In this example, all of the light out-coupling structures 44 have the same beam redirecting face angle $\alpha$ and each lenticular lens 56 is centered over the single associated light out-coupling column 44. The light redirected by each light out-coupling column 44 has an angular width $\beta$ such that only one lenticular lens 56 is illuminated by light from the light out-coupling column 44.

The out-coupling structures 44 are designed such that the light couples out perpendicularly from the waveguide 40. Taking prism-like structures as examples, the top half angle $\alpha$ is:

$$\alpha = 45°$$

The angular width $\beta$ of the out-coupled beam can now be calculated using equation 1 and is equal to:

$$\beta = 2\sin^{-1}(\sqrt{m^2 - 1})$$

To prevent cone repetition, the angular width is matched to the lenticular lenses 56 on top of the waveguide such that each out-coupled beam only hits one lens. This can be achieved by making:

$$\beta = 2\tan^{-1}(p/2e)$$

where p is the lens pitch and e is the optical path length from the out-coupling structure 44 to the lens 56.

Combining these equations, the required refractive index ratio m between the waveguide and the lenticular lens should be:

$$m = \sqrt{[\sin(\beta)^2] + 1} = 1 + \frac{p^2}{2e^2} + O(p^3) \text{ as } p \to 0.$$

A larger value of $\beta$ requires stronger lenses increasing the optical aberrations, whereas a smaller value of $\beta$ improves the optical quality but results in a thicker optical stack. If we take values for $\beta$ in the range of 20 to 45 degrees, typical values of m are obtained in the range around 1.05 to 1.23 and it is therefore possible to achieve this ratio with realistic materials.

A uniform out-coupling from the waveguide can be provided across the entire panel, despite the proximity of the light sources 42 to the edges. For example, the height of the structures can be tuned along the waveguide to change the relative out-coupling of each of the structures. This is a known approach to those skilled in the art.

The embodiment of FIG. 8 generates a collimated output. This can be used for example for a privacy display.

Figure 9:
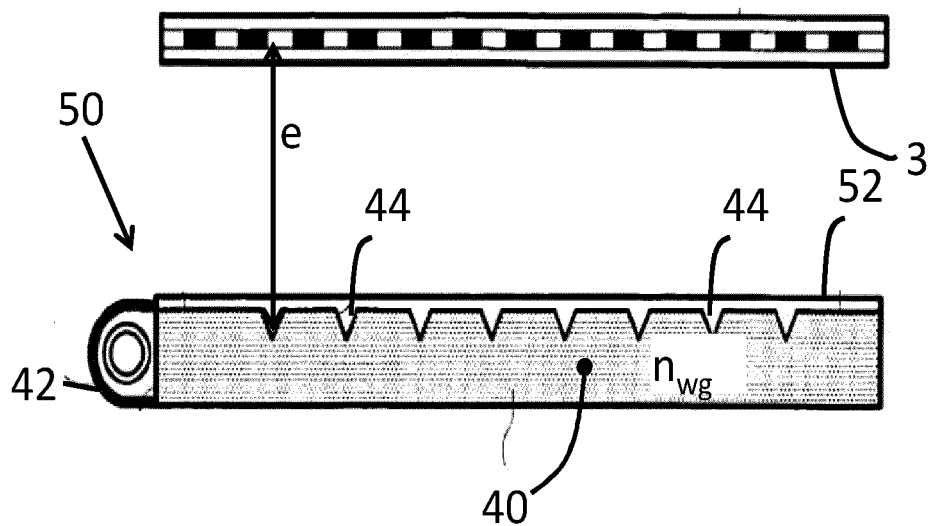
FIG. 9 shows a first example of an autostereoscopic display.

A second embodiment shown in FIG. 9 is based on forming an autostereoscopic display without cone repetition.

This is based on the general architecture shown in WO 2005/031412.

The waveguide 40 has light out-coupling structures 44 provided on the top face. These again comprise projections into the waveguide. Furthermore, the top face of the waveguide material is provided with a coating 52 which fills the projections 44 and optionally also provides a layer over the top. The coating has a refractive index higher than the refractive index $n_{wg}$ of the waveguide material so that the light out-coupling structures again allow the escape of light. The light enters a groove across the low-to-high refractive index boundary, and is then reflected by total internal reflection at the high-to-low refractive index boundary. This reflected light escapes from the waveguide 40. There is again a reflecting face, but the reflection in this case must be by total internal reflection.

The light out-coupling structures 44 again each comprise a column spanning from the top edge to the bottom edge in order to form stripes of illumination.

A display panel 3, in the form of an LCD panel, is provided over the backlight 50. The LCD panel itself functions as a barrier (as is known for barrier type autostereoscopic displays) so there is no lenticular lens arrangement.

Note that a switchable diffuser can be provided between the backlight and LCD panel to make the device switchable between 2D and 3D modes. This is shown in WO 2005/031412 of the current applicant.

The concepts explained above can be applied to this type of backlight. The value m is chosen such that the light fans out to illuminate the LCD panel with little or no overlap (in the same way as shown in FIG. 8), thus creating an autostereoscopic display without cone repetition and with a minimal number of components.

The cone angle $\gamma$ in air corresponds to m by:

$$\gamma = 2\sin^{-1} n_{out}\sqrt{m^2 - 1}$$

The spacing e between the out-coupling structures 44 and the LCD panel follows from the internal angle $\beta$ and the pitch of the grooves p as explained above. If e is slightly larger, then the two outermost views have crosstalk. If e is slightly smaller, then the outermost views have less intensity. Both result in an effective reduction of the useful cone size but can be compensated for in the rendering. Thus the spacing e can be within 80% to 120% of the optical value.

For this embodiment typically m<1.05 or even m<1.01. These very low differences in refractive index are common for materials used in the manufacture of optical fibers.

The example of FIG. 9 implements a barrier function using the display panel, and the barrier provide the direction of different views in different directions.

Figure 10:
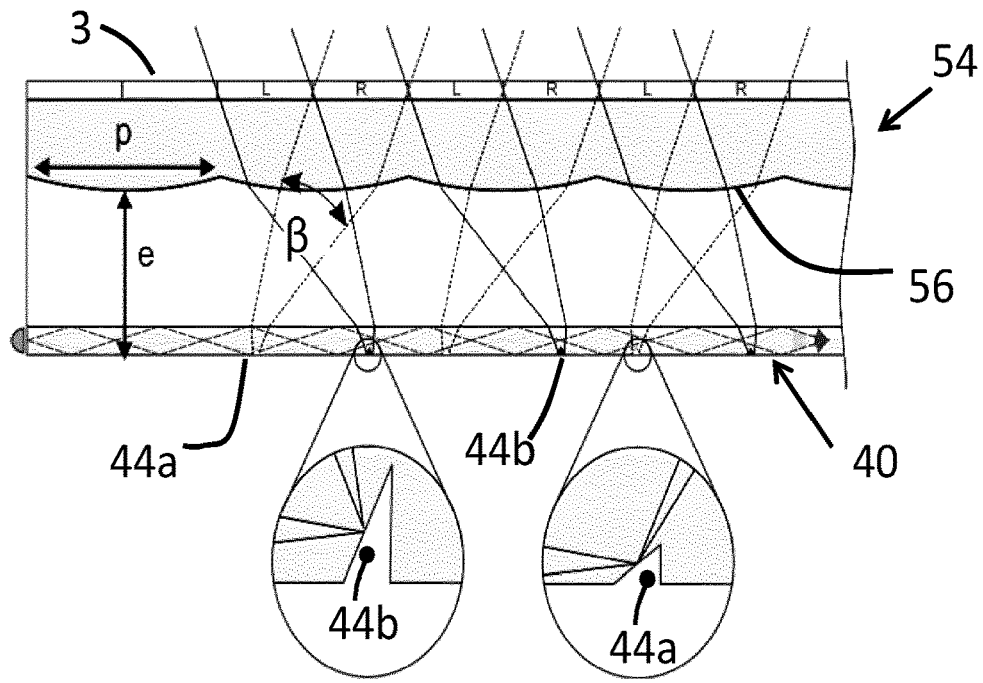
FIG. 10 shows a second example of an autostereoscopic display.

FIG. 10 shows an example in which the backlight implements the direction of different views in different directions. For this purpose, the light out-coupling structures comprise a plurality of sets. A first set comprises light out-coupling structures 44a and a second set comprises light out-coupling structures 44b. Within each set, the light out-coupling structures have the same beam redirecting face angle α. However, different sets have different beam redirecting face angles α. This is shown in FIG. 10.

Each lens 56 overlies one light out-coupling structure 44a, 44b from each set, and the light from each light out-coupling structure has an angular width β such that only a portion of one lenticular lens is illuminated by redirected light from the light out-coupling structure.

The display panel 3 is provided over the top of the lens and waveguide stack. This design provides spatially interleaved collimated beams.

The stack is designed such that only part of the lens is illuminated by each outgoing beam. The number of views created is equal to the number of sets of light out-coupling structure, i.e. two in the example shown. To create two views, only half of the lens should be covered by each outgoing beam. In general, this is achieved by making the angular width β of the outgoing beam equal to:

$$\beta = \frac{1}{N}\tan^{-1}(p/2e)$$

where N is the number of desired views. Thus, for the example of FIG. 10, N=2. Note that FIG. 8 is essentially equivalent to FIG. 10 with N=1, and is thus suitable for a single view display such as a privacy display.

Furthermore every neighbouring out-coupling structure 44 (neighbouring in the direction perpendicular to the lenses) should couple the light out in a different direction and in the same direction as the out-coupling structure N positions further along. These different directions can be achieved by tuning the angle α of the structures and the refractive index ratio m using equation 1 above.

The light out-coupling structures 44 are placed at the correct position under the lenses so that N different collimated directions of light come out of the backlight. The light then hits the display panel 3 where content can be encoded into the light field to make it an N-view autostereoscopic display.

Each lens has a pitch corresponding to the width of a number of sub-pixels equal to the number of views. Thus, each sub-pixel is imaged in a different direction.

Figure 11:
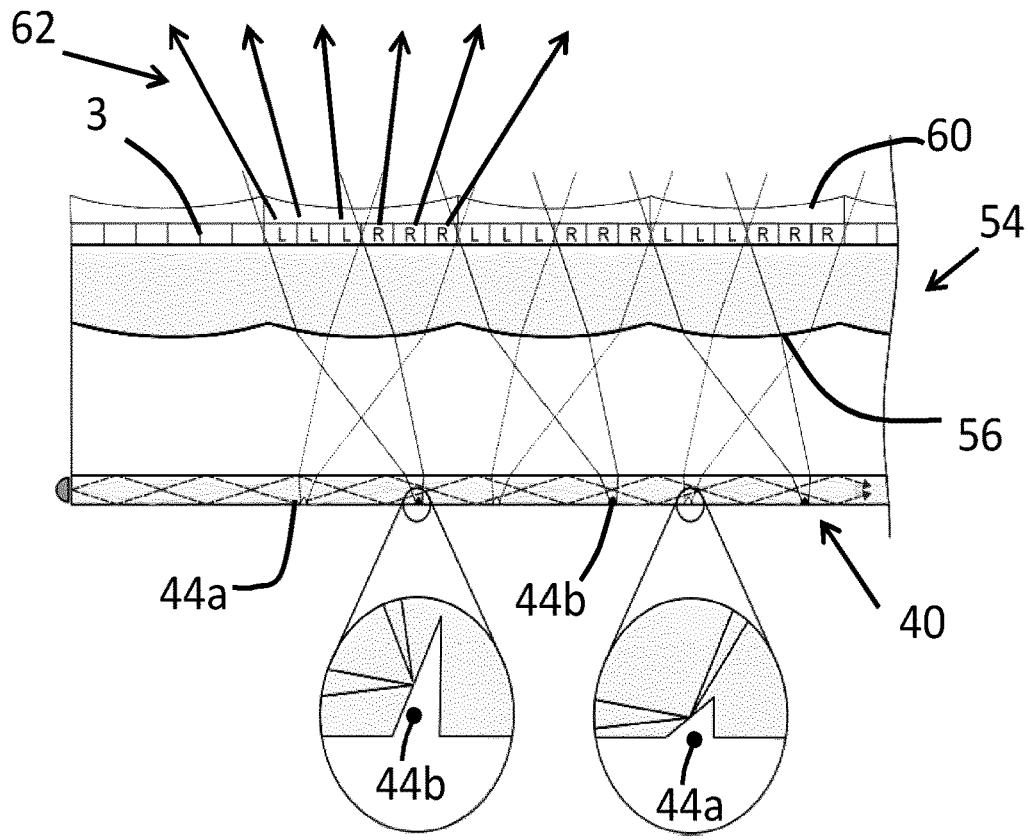
FIG. 11 shows a third example of an autostereoscopic display.

To create more than N views created by the backlight, an array of negative lenses 60 can be provided on top of the stack, over the display panel 3, as shown in FIG. 11.

Each lens 60 also has a pitch corresponding to the combined width of a number of sub-pixels equal to the number of views. Thus, the lenses 60 have the same width as the lenses 56 and there is thus a one-to-one mapping between lenses of the display backlight and the lenses of the further array.

In this case, the number of created views from the display is more than the number of sets of light out-coupling structures. In FIG. 11 there are two sets but six views. Since the each of the six sub-pixels is beneath a different part of the negative lens 60, they are each imaged to a different location as shown by arrows 62.

Thus, each sub-pixel is imaged in a different direction.

Note that a negative lens array can be added to the example of FIG. 8 to convert from the single view (N=1) to multiple views, in the same way.

As in the examples above, it is possible to provide a uniform out-coupling from the waveguide across the entire panel.

Figure 12:
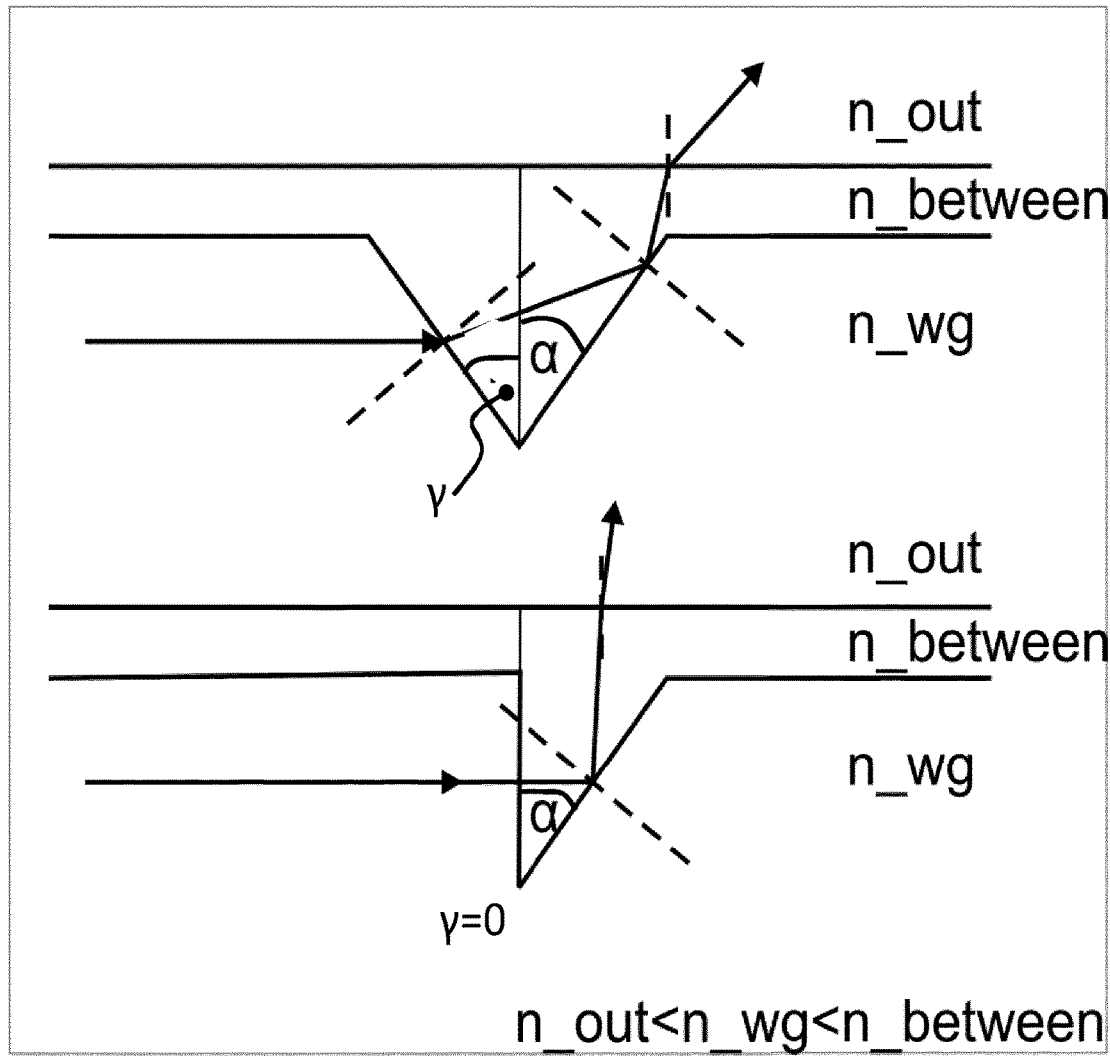
FIG. 12 is used to show that different light out-coupling structures give rise to different optical redirection functions.

As mentioned above, the invention can be applied to different designs of light out-coupling structure, and the equations presented are for one set of examples only. FIG. 12 shows two different possible light out-coupling structures which can be used at the top of the waveguide of FIG. 9, to show that different designs require different mathematical solutions.

The top image shows a projection with an input face at an angle γ which performs refraction and an output face at an angle α which performs reflection.

The bottom image shows a projection with an input face normal to the plane of the waveguide (i.e. γ=0) and an output face at an angle α which performs reflection.

Despite the same reflection face angle α the optical redirection is different, so that the equations to define the range of designs which produce non-clipped and narrow output beams will be different. However, using the teachings above, it will be apparent to those skilled in the art how to model the out-coupling performance and then select the required parameters to achieve the inventive advantages.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. A display backlight, comprising:
a waveguide, the waveguide having a top face, a bottom face and a pair of opposite side edges,
wherein the waveguide is arranged such that light output is from the top face,
wherein the top face and the bottom face are parallel to each other,
wherein the waveguide comprises material having a refractive index $n_{wg}$;
a light source, wherein the light source is arranged to provide light into the waveguide material at one or both of the opposite side edges; and
an array of light out-coupling structures,
wherein the light out-coupling structures are formed at the top face or the bottom face,
wherein the light out-coupling structures are arranged to redirect light so that it escapes from the waveguide at the location of the light out-coupling structures, wherein the light out-coupling structures are arranged to provide escaped light with a range of output directions,
wherein the output direction of escaped light is limited to less than 180 degrees,
wherein the escaped light is angularly spaced from the plane of the top face,
wherein the light-out coupling structures each comprise a projection into the waveguide material,
wherein each projection has a beam redirecting face,
wherein each beam redirecting face is at a respective angle to a direction normal to the top and bottom faces,
wherein the backlight is arranged to be used with a refractive index waveguide material,
wherein the refractive index waveguide material is disposed over the top face,
wherein the refractive index waveguide material has an index of refraction of $n_{out}$,
wherein for a refractive index ratio $m=n_{wg}/n_{out}$:

$$1 < m < \sqrt{2}; \text{ and}$$

$$\left(90° - \sin^{-1}\left(\frac{1}{m}\right)\right) < \alpha < \sin^{-1}\left(\frac{1}{m}\right),$$

wherein $\alpha$ is the angle of the beam redirecting face to the normal direction.

2. The display backlight as claimed in claim 1, wherein all of the light out-coupling structures have the same beam redirecting face angle $\alpha$.

3. The display backlight as claimed in claim 1, wherein the light out-coupling structures comprise a plurality of sets the light out-coupling structures within each set having the same beam redirecting face angle $\alpha$, and the different sets having different beam redirecting face angles $\varphi$.

4. The display backlight as claimed in claim 1,
wherein the light out-coupling structures each comprise a column spanning from a top edge to a bottom edge of the display backlight,
wherein the display backlight further comprises an array of lenticular lenses, the array of lenticular lenses disposed over the waveguide material,
wherein each lens overlies at least one an associated light out-coupling column.

5. The display backlight as claimed in claim 4, wherein the range of output directions $\beta$ is selected to be $$\beta = 2 \tan^{-1}(p/2e)$$

wherein p is a pitch of the lenticular lenses and e is the optical path length from the light out-coupling structures to the lens array.

6. The display backlight as claimed in claim 4,
wherein all of the light out-coupling structures have the same beam redirecting face angle $\alpha$;
wherein each lenticular lens is centered over a single associated light out-coupling column;
wherein the angle $\alpha$ is 45 degrees;
wherein the light redirected from each light out-coupling column has an angular width such that only one lenticular lens is illuminated by reflected light from the light out-coupling column.

7. An autostereoscopic display device comprising:
a backlight as claimed in claim 6; and
a display panel the display panel having an array of display pixels,
wherein the display pixels are arranged to produce a display image,
wherein the display is illuminated by the backlight,
wherein the display device further comprises a second array of lenticular lenses disposed over the display,
wherein the further array of lenticular lenses is arranged to have a one-to-one mapping between the array lenticular lenses and the second array of lenticular lenses,
wherein the array lenticular lenses are positive lenses and the second array of lenticular lenses are negative lenses.

8. The display backlight as claimed in claim 4,
wherein the light out-coupling structures comprise a plurality of sets, the light out-coupling structures within each set having the same beam redirecting face angle $\alpha$, and the different sets having different beam redirecting face angles $\varphi$;
wherein each lens overlies one light out-coupling column from each set,
wherein the light from each light out-coupling column has an angular width such that only a portion of one lenticular lens is illuminated by redirected light from the light out-coupling column.

9. The display backlight as claimed in claim 1,
wherein the light out-coupling structures are provided on the bottom face,
wherein each light out-coupling structure comprises a reflecting face, the reflecting face facing the light source arrangement,
wherein the light source arrangement provides light to both side edges.

10. A display backlight as claimed in claim 9, wherein $1.05 < m < 1.23$.

11. The display backlight as claimed in claim 1,
wherein the light out-coupling structures are provided on the top face,
wherein the top face of the waveguide material is provided with a coating,
wherein the coating fills the projections,
wherein the coating has a refractive index higher than the refractive index $n_{wg}$ of the waveguide material.

12. The display backlight as claimed in claim 11, wherein each of the light out-coupling structures comprise a column spanning from the top edge to the bottom edge.

13. The display backlight as claimed in claim 11, wherein $m < 1.05$.

14. An autostereoscopic display device comprising:
a backlight as claimed in claim 1; and
a display panel, the display panel having an array of display pixels,
wherein the display pixels are arranged to produce a display image,
wherein the display is illuminated by the backlight.

15. A display backlight as claimed in claim 1,
wherein the light out-coupling structures are provided on the bottom face,
wherein each light out-coupling structure comprises a pair of reflecting faces on opposite sides of the normal to the top and bottom faces and
wherein the light source arrangement provides light to both side edges.

* * * * *